March 20, 1956     W. D. LUDWIG     2,739,274
SOLENOID STOP BRACKET
Filed June 1, 1951
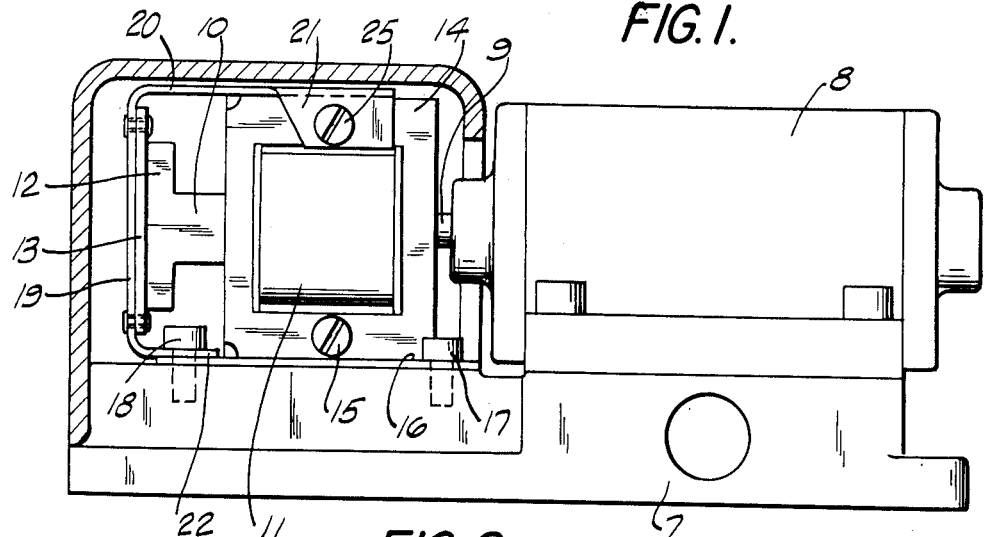
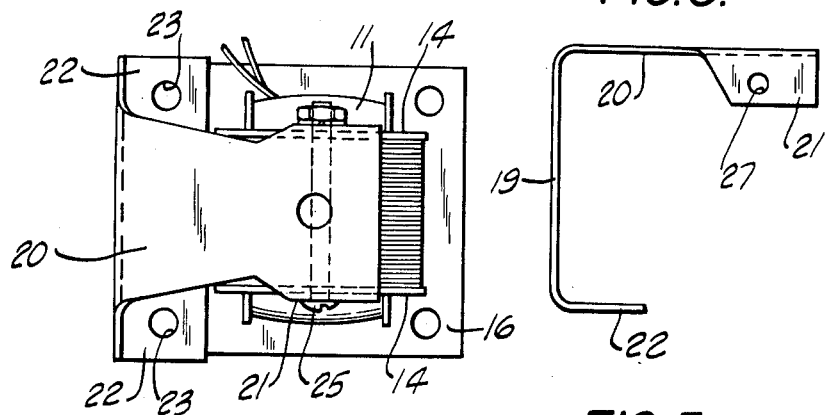
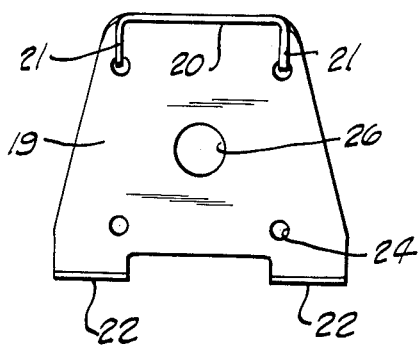
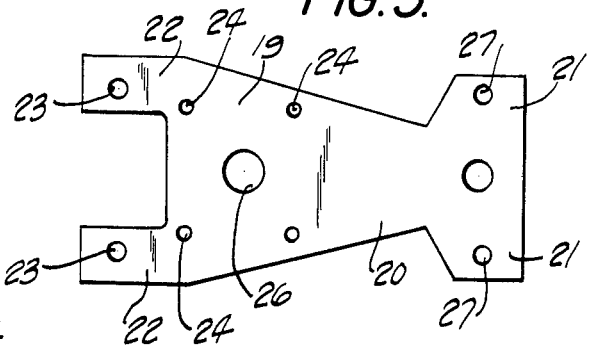
INVENTOR.
WALTER D. LUDWIG.
BY Thos. S. Donnelly
ATTORNEY.

United States Patent Office 2,739,274
Patented Mar. 20, 1956

2,739,274
SOLENOID STOP BRACKET

Walter D. Ludwig, Royal Oak, Mich.

Application June 1, 1951, Serial No. 229,462

3 Claims. (Cl. 317—191)

My invention relates to a new and useful improvement in a solenoid stop bracket adapted primarily for use on structures such as and similar to solenoid operated valves in which a sliding spool is moved in one direction by a spring and moved in the opposite direction by a solenoid. Experience has shown that in a valve operation of this type after the deenergizing of the solenoid the spring will, through the thrust of the sliding spool on the core, return the core quickly and with considerable violence in one direction. It is customary to have an abutment for engaging the core and preventing its displacement from the soil. Experience has shown that these abutments, unless made of excessively heavy material, are frequently distorted or broken.

It is an object of the present invention to provide a solenoid stop bracket which will be light, economically manufactured, durable and rigidly mounted.

Another object of the invention is the provision of a stop bracket which may be attached to the solenoid C-frame structure and at the same time attached to the base of the valve so as to have the bracket mounted at two separated points which also serve as a means for strengthening the mounting of the solenoid structure on the supporting base.

Other objects will appear hereinafter.

It is recognized that modifications and changes may be made in the detail of structure illustrated without departing from the invention and the present disclosure is to be considered but the preferred embodiment.

Forming a part of this application are drawings in which,

Fig. 1 is a side elevational view of the invention showing it mounted in operative position.

Fig. 2 is a top plan view showing the invention mounted.

Fig. 3 is a side elevational view of the invention.

Fig. 4 is a rear elevational view of the invention.

Fig. 5 is a plan view of the blank from which the invention is made.

In the drawings I have shown the invention used with a valve structure embodying a base 7 and a valve housing 8 slidably projecting through which is a spool valve with the stem 9 extending outwardly of the housing and adapted for engaging the end of the core 10 of a solenoid, this core being projected through the coil 11. The core 10 is provided at one end with the head 12 adapted for engaging against a plate 13 of suitable insulating material. Mounted at opposite sides of the C-frame of the solenoid is a frame 14 which is secured in position by the screw 15 extending through the laminations. The solenoid is suitably secured by welding, or in any other desired manner, to a plate 16 which is secured on a base 7 by means of the bolts 17 and 18. The bracket is preferably a stamping formed from a blank such as shown in Fig. 5 and which embodies the vertically extended portion 19. The top horizontally directed portion 20 is connected at opposite sides with the outstanding lugs or ears 21. At the lower end of the portion 19 tongues 22 are bent to extend horizontally and form feet which rest upon the plate 16 and through each of which is directed one of the screws 18. Extended through the frame of the solenoid is a bolt 25 which also passes through the ears 21 to secure the upper portion of the bracket in fixed relation to the solenoid.

Formed in the part 19 is an opening 26 which is in alignment with the axis of the valve stem 9. Formed in this part 19 are openings 24 through which screws or other suitable attaching means may be placed for mounting the insulating plate 13 on the body 19. The feet 22 are each provided with an opening 23 through which the bolts 18 are passed and the bolt 25 is passed through openings 27 formed in the ears 21.

In the use of the invention illustrated when the solenoid is energized the core 10 will move to the right forcing the stem 9 to move to the right to operate the valve within the housing 8. Upon deenergizing of the solenoid, the stem 9 of the valve spool will move in response to spring pressure to the left, forcing the head 12 to violently contact against the insulation plate 13. This thrust is resisted by the bracket and it will be noted that the bracket is mounted at the top and at the bottom, that is at two separated points, and that the point of impact on the bracket is between these two points of mounting. Experience has shown that with a bracket constructed in this manner a light stamping may be used and thus the desired lightness in the structure obtained while at the same time, due to the construction and mounting of the bracket, the durability and efficiency sought is also present.

What I claim is:

1. A solenoid stop bracket adapted for use with a solenoid having a frame and mounted on a base and provided with a slidable core comprising: a U-shaped bracket mounted at one of its legs to said frame at one side and secured at its opposite leg to said base at the opposite side of said frame with the bight of said U-shaped member extending across the path of travel of said core.

2. In combination with a solenoid embodying a coil, a frame embracing said coil and a reciprocating core projectable through said coil, a base; a means for securing said frame on said base; a bracket comprising a single piece of material forming a body; an angularly turned portion at one end of said body extending at right angles thereto; a pair of spaced apart angularly turned feet at the opposite end of said body and extending parallel to said angularly turned portion, said angularly turned portion being longer than said feet; and an ear at each side of said angularly turned portion adjacent to the end thereof and extending toward the plane of said feet and secured to opposite sides of said frame; and securing means securing said feet to said base.

3. In combination with a solenoid embodying a coil, a frame embracing said coil and a reciprocating core projecting through said coil, a base; means for securing said frame on said base; a U-shaped bracket having a pair of spaced apart legs and a bight, one of said legs being longer than the other and the shorter of said legs being secured to said base, the longer of said legs overlying the upper side of said frame and secured adjacent its ends to said frame, said bight extending across the path of travel of said core.

References Cited in the file of this patent

UNITED STATES PATENTS

| | | |
|---|---|---|
| 1,547,576 | Ferguson | July 28, 1925 |
| 1,669,929 | Currier | May 15, 1928 |
| 2,174,592 | Peek | Oct. 3, 1939 |
| 2,246,890 | Miller | June 24, 1941 |
| 2,288,938 | Claytor | July 7, 1942 |
| 2,410,279 | Favre | Oct. 29, 1946 |
| 2,459,078 | Jeffrey | Jan. 11, 1949 |

OTHER REFERENCES

Abstract of application No. 755,368, published in O. G., vol. 630, page 859, January 17, 1950.